(12) United States Patent
Hashiba et al.

(10) Patent No.: US 7,416,779 B2
(45) Date of Patent: Aug. 26, 2008

(54) FIBER BOARD AND ITS PRODUCING METHOD

(75) Inventors: Masanori Hashiba, Mizunami (JP); Takehiro Kato, Aichi (JP); Kousuke Tamaki, Toyota (JP); Osamu Mito, Otsu (JP); Kazuya Matsumura, Ibaraki (JP); Tomomichi Fujiyama, Otsu (JP); Yuhei Maeda, Yokohama (JP); Eiji Sugiyama, Anjyo (JP); Takashi Inoh, Toyota (JP); Hiroshi Urayama, Aichi (JP); Hisashi Okuyama, Aichi (JP)

(73) Assignees: Toyota Auto Body Co. Ltd. (JP); Toyota Boshoku Co. Ltd. (JP); Toray Industries, Inc. (JP); Toyota Tsusho Corporation (JP); Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 10/663,672

(22) Filed: Sep. 17, 2003

(65) Prior Publication Data

US 2004/0096623 A1    May 20, 2004

(30) Foreign Application Priority Data

Sep. 18, 2002  (JP) ............................. 2002-271544

(51) Int. Cl.
*D04H 1/00* (2006.01)
*B32B 1/08* (2006.01)

(52) U.S. Cl. ............... 428/292.1; 428/36.4; 428/36.3; 428/411; 428/1; 428/36.91

(58) Field of Classification Search ............... 428/35.8, 428/36.4, 182, 532, 220, 152, 906, 323, 373, 428/370, 375, 394, 218, 36.3, 36.91, 411.1; 156/296, 332, 307.1; 264/109, 121, 257
See application file for complete search history.

(56) References Cited

U.S. PATENT DOCUMENTS 5,350,627 A     9/1994  Nemphos et al.
5,830,548 A *  11/1998  Andersen et al. ........... 428/36.4

(Continued)

FOREIGN PATENT DOCUMENTS

EP        0 533 314 A2    3/1993

(Continued)

OTHER PUBLICATIONS

European Search Report for co-pending application mailed on Jan. 27, 2004.

(Continued)

*Primary Examiner*—Milton I. Cano
*Assistant Examiner*—Carnie S Thompson
(74) *Attorney, Agent, or Firm*—Rader Fishman & Grauer PLLC

(57) ABSTRACT

To provide a fiberboard capable of reducing a load on the environment at all states of producing, using, and abolishing and moreover having a high degree of bending strength and a high bending-strength retention rate at high temperature and high humidity so as to be usable for an automobile interior material or building material and a fiber-board producing method. The fiberboard is formed by mixing natural fiber with polylactic acid resin serving as a binder and has an apparent density of 0.2 g/cm$^3$.

3 Claims, 1 Drawing Sheet

U.S. PATENT DOCUMENTS

| | | | |
|---|---|---|---|
| 6,281,298 B1 * | 8/2001 | Papsin, Jr. | 525/419 |
| 6,582,818 B2 * | 6/2003 | Haile et al. | 428/373 |
| 6,596,386 B1 * | 7/2003 | Reck et al. | 428/292.4 |
| 2002/0128344 A1 | 9/2002 | Fujihira et al. | |

FOREIGN PATENT DOCUMENTS

| | | |
|---|---|---|
| EP | 0 805 181 A1 | 11/1997 |
| EP | 1 215 225 A1 | 6/2002 |
| JP | 02-222421 A1 | 9/1990 |
| JP | 06-047714 | 2/1994 |
| JP | 07-119098 A1 | 5/1995 |
| JP | 08-193168 A1 | 7/1996 |
| JP | 09-095531 | 4/1997 |
| JP | 09-110967 A1 | 4/1997 |
| JP | 09-272760 A1 | 10/1997 |
| JP | 11-080522 A1 | 3/1999 |
| JP | 3055422 B2 | 4/2000 |
| JP | 2000-127117 A1 | 5/2000 |
| JP | 2001-001319 A1 | 1/2001 |
| JP | 2001-047412 | 2/2001 |
| JP | 2001-179716 A1 | 7/2001 |
| JP | 2001-226864 A1 | 8/2001 |
| JP | 2001-253964 A1 | 9/2001 |
| JP | 2001-261797 A1 | 9/2001 |
| JP | 2002-030208 | 1/2002 |
| JP | 2002-069303 A1 | 3/2002 |
| JP | 2002-240151 | 8/2002 |
| JP | 2003-055871 A1 | 2/2003 |
| WO | WO-92/05311 A1 | 4/1992 |

OTHER PUBLICATIONS

Levit M.R. et al., "Composites Based on Polylactic Acid and Cellulosic Fibrous Materials, Mechanical Properties and Biodegradability", Rapra Abstracts, Pergamon Press Ltd., Oxford, Great Britain, vol. 33, No. 12, Dec. 1, 1996, p. 111, ISSN: 0033-6750.

* cited by examiner

FIBER BOARD AND ITS PRODUCING METHOD

BACKGROUND OF THE INVENTION

1. Field of the Invention

The present invention relates to a fiberboard used as an automobile interior material or building material and its producing method.

2. Detailed Description of the Prior Art

A fiberboard formed by hot-pressing a fiber-layered product obtained by mixing thermoplastic fiber with a fibrous material is used as an automobile interior material such as a door-trim base material, inner panel, pillar garnish, rear package, ceiling base material, shock absorber or acoustic material, or as a building material such as a wall material, floor material, shock absorber under-floor or heat insulator.

Moreover, a fiberboard made by mixing natural fiber with cellulose biodegradable plastic is disclosed (refer to, for example, Japanese Patent Laid-Open No. 2000-127117) as a fiberboard having biodegradability with a view to reduction of the environmental load, given the recent emergence of global environmental problems, on final disposal.

However, with the cellulose biodegradable plastic there exists a problem in that it requires much solvent, resulting in a considerable degree of influence on the environment, at the producing stage. This type of the solvent includes alkaline solvent used in a process for isolating cellulose from a plant, dimethylacetamide, dimethyl sulfoxide or N-methyl morpholine-N-oxide used for synthesizing cellulose derivative, and carbon disulfide or methylene chloride used for fibrosing the plastic.

Though the cellulose biodegradable plastic is non-petroleum biodegradable plastic, much petroleum solvent is used in its manufacturing process. Therefore, it is a problem that the cellulose biodegradable plastic greatly influences the environment when all stages of producing, use, and final disposal of a fiberboard using the cellulose biodegradable plastic are considered.

SUMMARY OF THE INVENTION

The present invention is made to solve the above problems of the prior art and its object is to provide a fiberboard capable of decreasing the load on the environment at all stages of producing, use, and final disposal of the fiberboard and having, moreover, a high degree of bending strength and a high bending-strength retention rate under a high temperature and high humidity so that it can be used as an automobile interior material or building material; together with providing its producing method.

To solve the above problems, the present invention uses the following means:

(1) A fiberboard in which polylactic acid resin is mixed in natural fiber as a binder and which has an apparent density of 0.2 g/cm$^3$ or more.

(2) The fiberboard in which the carboxyl-terminal quantity of the polylactic acid resin is an equivalent weight/t of 10 or less.

(3) The fiberboard in which a polycarbodiimide compound is added to the polylactic acid resin.

(4) The fiberboard in which a polylactic acid resin whose remaining monomer quantity under a raw-pellet state is 500 ppm or less is used.

(5) The fiberboard in which the bending strength calculated in accordance with the following expression is 30 MPa or more as an initial value.

Bending strength (MPa)=$3PL/2Wt^2$

P: Maximum bending load (N)
L: Distance between fulcrums (mm)
W: Width of test piece (mm)
t: Thickness of test piece (mm)

(6) The fiberboard in which the retention rate to the initial value of a bending strength to an initial value after leaving the board as it is for 1,200 hours at a high temperature of 50° C. and a high humidity of 95% RH is 20% or more.

(7) The fiberboard in which a mix rate of the polylactic acid resin ranges between 10 and 90 wt %.

(8) A fiberboard producing method in which a polylactic acid resin whose remaining monomer quantity under a raw-pellet state is 500 ppm or less is fibrosed through melt spinning and fiber of the polylactic acid resin is mixed with natural fiber to form a sheet and hot-pressed.

(9) The fiberboard producing method in which polycarbodiimide compound is kneaded with the polylactic acid resin and then the polylactic acid resin is fibrosed through melt spinning.

According to the present invention, it is possible to provide a fiberboard capable of decreasing the load on the environment at all stages of its producing, use, and final disposal and having, moreover, a high degree of bending strength and a high bending-strength retention rate under a high temperature and high humidity so that can be used as an automobile interior material or building material by combining natural fiber with polylactic acid resin.

DETAILED DESCRIPTION OF THE PREFERRED EMBODIMENT

Figure 1:
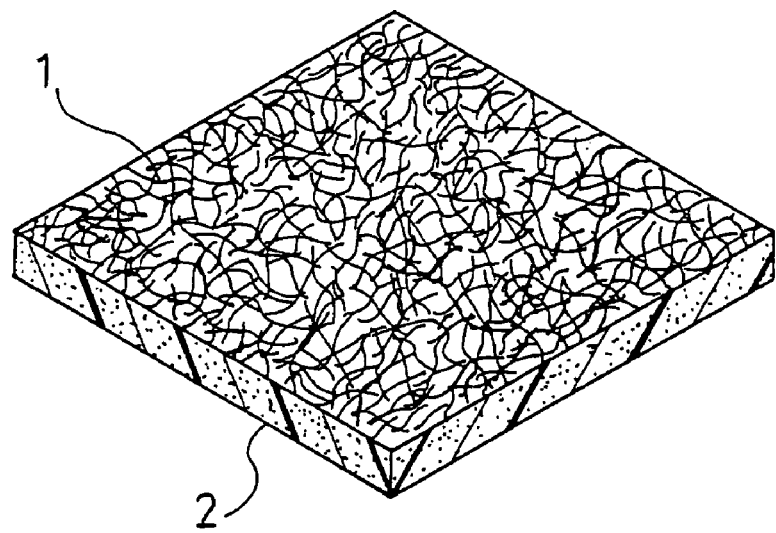
FIG. 1 is a perspective sectional view showing a fiberboard of the present invention.

For natural fiber as a main material of a fiberboard of the present invention, various cellulose fibers such as woody or herbaceous cellulose fibers can be used. Specifically, it is possible to use (a) wood pulp, (b) graminoid pulp such as bagasse, straw, reed, papyrus or bamboo, (c) cotton, (d) bast fiber such as kenaf, roselle, flax, linum, ramie, jute or hemp, and (e) leaf fibers such as sisal hemp or Manila hemp.

Among the above fibers, it is preferable to use the fiber sampled from kenaf belonging to the herbaceous plant which is annual grass, very quickly grows in tropical and temperate zone, and is easy to cultivate from viewpoints of effective use of natural resources and recycling. Particularly, because the cellulose component is contained in the bast of kenaf at a high content of 60% or more, it is preferable to use the kenaf fiber sampled from the kenaf bast.

Moreover, the polylactic acid resin made of natural material having biodegradability is used as the binder of the natural fiber. The polylactic acid resin is a non petroleum-based biodegradable plastic and hardly requires petroleum solvent in its manufacturing process. Therefore, when all stages of producing, use and final disposal of a fiberboard are considered, it is possible to reduce the load on the environment. Moreover, the polylactic acid resin has a melting point of 170° C. approximately and a proper heat resistance. The polylactic acid resin is also superior in molding and in adhesiveness with natural fiber among biodegradable plastics. Furthermore, the polylactic acid resin is superior in bending strength and aging property after it is molded into a board, particularly the resin is hardly decreased in bending strength after it is left as it is at a high temperature and high humidity.

In the case of the present invention, the polylactic acid resin contains not only homopolymer but also copolymer and blend polymer. The polylactic acid resin generally has weight-average molecular weight of 50,000 to 500,000. Moreover, it is allowed that the component molar ratio L/D between L-lactic acid unit and D-lactic acid unit in the polylactic acid resin is any one of 100/0 to 0/100. To obtain a high melting point, however, it is preferable to contain either of the L-lactic acid and D-lactic acid units by 75 mole percent or more. To obtain a higher melting point, it is preferable to contain either of the L- and D-lactic acid units by 90 mole percent or more.

The lactic acid copolymer is made by copolymerizing lactic acid monomer or lactide and another component which can be copolymerized. As the another component, any one of dicarboxylic acid having two or more ester-linkage-forming functional groups, polyhydric alcohol, hydroxycarboxylic acid, and lactone as well as various types of polyester, various types of polyether, various types of polycarbonate, which are made of these various components, can be used.

Moreover, a small quantity of a chain elongation agent may be added to the polylactic acid resin in order to increase the molecular weight of the polylactic acid resin. For example, it is allowed to increase the molecular weight of the polylactic acid resin by adding a diisocyanate compound such as hexamethylene diisocyanate, isophorone diisocyanate, xylylene diisocyanate or diphenylmethane diisocynate, or to obtain aliphatic polyester carbonate by using a carbonate compound. Moreover, it is allowed to contain an additive or particles such as flame retardant, antistatic agent or antioxidant-not so as not to spoil the property of the polylactic acid resin.

A fiberboard of the present invention is molded so that the apparent density is $0.2$ g/cm$^3$. By setting the apparent density to $0.2$ g/cm$^3$, it is possible to have a bending strength which is required to be used for an automobile interior material and building material. Particularly, to obtain a bending strength preferable for the above-described purposes, an apparent density of $0.4$ g/cm$^3$ or more is preferable and an apparent density of $0.6$ g/cm$^3$ or more is more preferable. An apparent density is measured in accordance with the following expression.

Apparent density (g/cm$^3$)={Weight of fiberboard (g)}/ {Volume of fiberboard (cm$^3$)}

In this case, the weight (g) of a fiberboard is assumed as a weight after leaving the fiberboard as it is for 24 hours at a standard condition of 20 C. and 65% RH. Moreover, it is assumed to obtain the volume (cm$^3$) of the fiberboard in accordance with the following expression by measuring thickness t (cm) of a test piece of 10 cm×10 cm while applying no load to the test piece.

Volume (cm$^3$) of fiberboard=10 cm×10cm×$t$ (cm)

Moreover, in the case of the present invention, it is preferable that the carboxyl-terminal quantity of the polylactic acid resin contained in the fiberboard is an equivalent weight/t (ton) of 10 or less. When assuming that the carboxylterminal quantity is the equivalent weight/t of 10 or less, it is possible to suppress the hydrolysis of the polylactic acid resin and to prevent reduction of the aging property of the fiberboard. Especially, to prevent the reduction of the bending strength of the fiberboard after leaving the board as it is at a high temperature and high humidity is possible.

To reduce the carboxyl-terminal quantity of the polylactic acid resin to the equivalent weight/t of 10 or less, it is only necessary to make a condensation-reactive compound such as aliphatic alcohol or amide compound, or an addition-reactive compound such as carbodiimide compound, epoxy compound, oxazoline compound, oxazine compound or aziridine compound react with the carboxyl-terminal of the polylactic acid resin and block the reaction product. By using the latter addition-reactive compound, it is not necessary to eject an extra by-product to the outside of a reaction system unlike the terminal blocking by a dehydration condensation reaction between alcohol and carboxyl group. Therefore, it is possible to add, mix and react an addition-reactive compound when melting and molding the polylactic acid resin. Thus, the above mentioned is advantageous to obtain a reaction product having a molecular weight, heat resistance and hydrolysis resistance high enough for practical use.

It is preferable to add the carbodiimide compound among the above addition-reactive compounds to the polylactic acid resin. By blocking the reactive terminal of the lactic acid polymer or the oligomer contained in the lactic acid polymer with a carbodiimide compound, the reaction-active terminal in the polymer is inactivated and hydrolysis of the polylactic acid resin is suppressed. As the above carbodiimide compound, a substance obtained by polymerizing diisocyanate is preferably used as disclosed in the Japanese Patent Laid-Open No. H11-80522. Particularly, it is preferable to use the polymer of 4,4'-dicyclohexylmethane carbodiimide, polymer of tetramethylxylylene carbodiimide, or a substance obtained by blocking the terminal of the polymer with polyethylene glycol.

Though the reaction active terminal of the lactic acid polymer or the oligomer contained in the polymer is a hydroxyl group or carboxyl group, a carbodiimide compound is superior in blocking characteristic of a carboxyl group. It is possible to decide an additional quantity of the carbodiimide compound for a carboxyl-terminal quantity. However, because remaining oligomer such as lactide causes a carboxyl-terminal due to hydrolysis, it is preferable to set the additional quantity of the carbodiimide compound to a quantity two times or less than the total carboxyl-terminal quantity including not only the carboxyl-terminal of the polymer but also the remaining oligomer and a substance derived from a monomer. By setting the total carboxyl-terminal density to an equivalent weight/t of 10 or less for the whole polylactic acid resin, it is possible to dramatically improve the hydrolysis resistance.

Moreover, the monomer quantity remaining in the polylactic acid resin used for the fiberboard of the present invention is set to 2,000 ppm or less under a raw pellet state, preferably set to 1,000 ppm or less, or more preferably set to 500 ppm or less. In the case of a polymerization method for manufacturing the polylactic acid resin, some of a great deal of monomer (lactide) or a small molecular weight (oligomer) remains in a polymer depending on the reaction balance between monomer and polymer. When the remaining monomer or small-molecular-weight oligomer is present in an end product (molded product, film, or fiber), it acts as a kind of a plasticizer or a trigger of hydrolysis to accelerate deterioration in the strength with time. Further, because the lactide is a sublimating substance, it sublimates in a fiber spinning process and attaches to a die or a nozzle to cause a thread breakage or its sublimate causes bad smell. Therefore, it is necessary to reduce the amount of remaining monomer in a polymer as little as possible. To reduce monomers, there are the methods for sublimating the monomer disclosed in the Japanese Patent No. 3055422 and the cleaning with a solvent disclosed in the official gazette of Japanese Patent Laid-Open No. H09-110967.

When using the fiberboard of the present invention particularly as an automobile interior material or a building material, it is preferable that the bending strength is 30 MPa or more as an initial value. The bending strength is calculated in accordance with the following expression.

Bending strength (MPa) = $3PL/2Wt^2$

P: Maximum bending load (N)
L: Distance between fulcrums (mm)
W: Width of test piece (mm)
t: Thickness of test piece (mm)

Moreover, in the case of the fiberboard of the present invention, it is preferable that the retention rate of the bending strength of the fiberboard is 20% or more after leaving the fiberboard as it is for 1,200 hours at a high temperature and high humidity of 50° C. and 95% RH. By setting the retention rate of the bending strength to 20% or more, it is possible to improve a long-term reliability as a material and increase the durability of the board against deformation or breakage when considering the using environment of the fiberboard. To improve such durability characteristic, it is preferable that the retention rate of the bending strength after leaving the board as it is for 1,200 hours at the high temperature and the high humidity of 50° C. and 95% RH is 30% or more of the initial value.

Furthermore, it is preferable that the mix rate of the polylactic acid resin in the fiberboard of the present invention ranges between 10 wt % and 90 wt %. When the mix rate is kept in the range of 10 wt % to 90 wt %, it is possible to select an optional mix rate in accordance with a request for stiffness, bending strength, or texture of the board. By setting the mix rate of the polylactic acid resin to 10 wt % or more, it is possible to completely function as a binder and set the initial bending strength to 30 MPa, and thus, the polylactic acid resin can be preferably used for the automobile interior material or the building material. Moreover, by setting the mix rate to 90 wt % or less, the property of the board differs from the property of the polylactic acid resin only and, thereby, it is possible to realize the fiberboard having the high stiffness and bending strength as well as suitable for using as the automobile interior material or the building material. It is more preferable that the mix rate of the polylactic acid resin ranges between 20 wt % and 60 wt %. It is the most preferable that the mix rate of the polylactic acid resin ranges between 30 wt % and 50 wt %.

Although methods for producing the fiberboard are not specifically restricted, for example, the following method can be adopted.

First, natural fiber is spread and cut into approximately 50 mm. On the other hand, polylactic acid resin is melt-spun, formed into fiber having a fineness of approximately 6 deciTex, crimped, and cut into approximately 50 mm. It is preferable to knead the polylactic acid resin with a polycarbodiimide compound before melt-spinning the resin. The natural fiber and the polylactic acid fiber are uniformly mixed and dispersed to form a fiber layered product. The fiber layered product is heated and pressurized to the melting point of a plurality of polylactic acid fibers and molded. In this case, by melting the polylactic acid fiber and bonding natural fibers each other or natural fiber with polylactic acid fiber, it is possible to obtain a fiberboard having sufficient stiffness and bending strength.

The fiberboard in the present invention is not limited to a flat board. The fiberboard may include a board having a pattern of convex or concave parts on a surface thereof and a board formed in an arbitrary shape such as a curved shape given by a press mold.

The obtained fiberboard is preferably used as the automobile interior material such as a door-trim base material, inner panel, pillar garnish, rear package, ceiling base material, shock absorber or acoustic material, or as the building material such as a wall material, a floor material, shock absorber under floor or heat insulator.

In the case of the above-mentioned fiberboard producing method, it is not always necessary to fibrose the polylactic acid resin. It is also possible to use a method for forming the polylactic acid resin into polylactic acid powder, flakes, pellets or a film, mixing it with natural fiber which is the main material under a solid or melted state, and molding it under a melted state with compression.

FIG. 1 shows a fiberboard of the present invention. In FIG. 1, symbol 1 denotes natural fiber and 2 denotes polylactic acid resin. The fiber formed by using the polylactic acid resin 2 as a binder and thereby packing the natural fiber 1 into a plate. It is a matter of course that the fiberboard of the present invention can be worked correspondingly to the shape of an article to be obtained because the shape of the fiberboard is not specifically restricted.

EXAMPLES

Embodiments of the present invention are described below. A measuring method in the embodiments uses the following method.

A. Total Carboxyl-Terminal Concentration

As disclosed in the Japanese Patent Laid-Open No. 2001-261797, after a weighed sample is dissolved in o-cresol whose water content is adjusted to 5%, a proper quantity of dichloromethane is added to the solution. Then it is titrated with KOH methanol of 0.02 N. In this case, because oligomer of lactide or the like which is a dimerized lactic acid is hydrolyzed to produce a carboxylterminal, a carboxyl-terminal concentration is obtained by totalizing the carboxyl-terminal of a polymer and the carboxyl-terminal derived from a monomer.

B. Bending Strength

Figure 2:
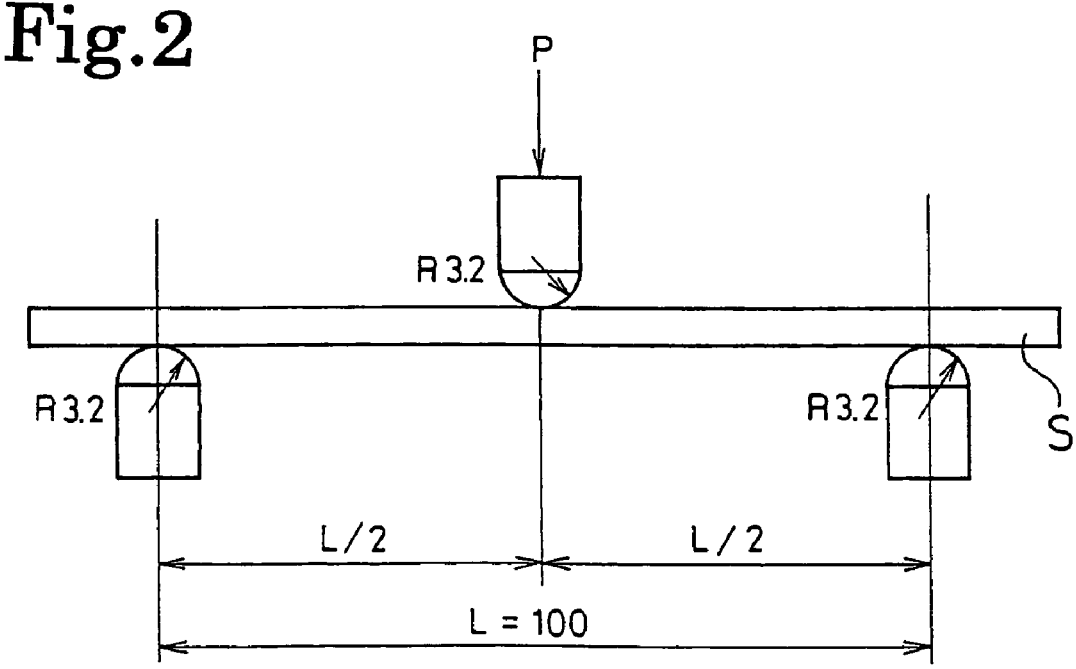
FIG. 2 is an illustration showing a bending-strength measuring method of the present invention.

A test piece S having a width W of 50 mm and a length of 150 mm is sampled from a prepared fiberboard. In this case, the plate thickness of the test piece S is assumed as t (mm). As shown in FIG. 2, a load P is applied to the center between fulcrums at a load speed of 50 mm/min while supporting the test piece S at an inter-fulcrum distance L=100 mm. In this case, the curvature radius R of fulcrum and load working point is assumed as 3.2 mm. Then, the maximum bending load P required to bend the test piece S is measured to obtain bending strengths in accordance with the following expression. The average value of the obtained bending strengths is assumed as the bending strength of the test piece S.

Bending strength (MPa) = $3PL/2Wt^2$

C. Monomer Quantity Measurement

Liquid containing monomers extracted from a sample immersed in acetonitrile is analyzed through liquid chromatography by using acetonitrile solvent, a polymer-system antiphase distribution column and a UV detector to calculate a monomer quantity through the absolute calibration curve method.

Embodiment 1

The polylactic acid resin was fibrosed through a publicly-known method, crimped and cut to obtain short fiber having a fineness of 6.6 deciTex and a length of 51 mm. In this case, the carboxyl-terminal concentration was an equivalent weight/t of 40. The polylactic acid resin and kenaf bast fiber cut into 65 mm were mixed at a weight ratio of 30:70 and combed to form sheets and sheets are layered to obtain a layered product having a basis weight of 1,600 g/m². The layered product was held between two dies together with a spacer having a thickness of 2.3 mm and hot-pressed by a pressing machine heated to 230° C. at a pressure of 2.4 MPa for 1 min.

The obtained fiberboard had a basis weight of 1,500 g/m², thickness of 2.3 mm, apparent density of 0.65 g/cm³, and bending strength of 33 MPa. Moreover, the carboxyl-terminal concentration of the polylactic acid resin in the board was an equivalent weight/t of 45. The bending strength was 7.7 MPa and the retention rate was 23% after treating the board at high temperature and high humidity of 50° C. and 95% RH.

Embodiment 2

The polylactic acid resin of the embodiment 1 was kneaded with the thermoplastic polycarbodiimide "KARUBOJIRAITO" HMV-8CA (equivalent weight of 1 of carbodiimide/278 g of carbodiimide) made by NISSHINBO INDUSTRIES, INC. serving as a polycarbodiimide compound. The additional quantity was set to 1.0-fold equivalent weight (1.0 wt % to polylactic acid resin) to a carboxyl-terminal quantity. As a result of fibrosing the resin into short fiber the same as the case of the embodiment 1, the carboxyl-terminal concentration was not more than an equivalent weight/t of 5 which is a detection limit. A fiberboard was obtained by setting other conditions so as to be the same as the case of the embodiment 1.

The obtained fiberboard had a basis weight of 1,600 g/m², thickness of 2.3 mm, apparent density of 0.70 g/cm³, and bending strength of 43 MPa. Moreover, the carboxyl-terminal concentration of the polylactic acid resin in the board was not more than an equivalent weight/t of 5 which is a detection limit. As a result of treating the board at high temperature and high humidity of 50° C. and 95% RH for 1,200 hours, the bending strength became 17 MPa and the retention rate was 39%.

Embodiment 3

The polylactic acid resin having a weight average molecular weight (Mw) of 121,000, a melting point (Tm) of 175.8° C., and monomer quantity of 487 ppm was kneaded with the thermoplastic polycarbodiimide "KARUBOJIRAITO" HMV-8CA (equivalent weight of 1 of carbodiimide/278 g of carbodiimide) made by NISSHINBO INDUSTRIES, INC. serving as a polycarbodiimide compound. The additional quantity was set to 1.0-fold equivalent weight (1.0 wt % to polylactic acid resin) to a carboxyl-terminal quantity. As a result of fibrosing the resin into short fiber the same as the case of the embodiment 1, the carboxyl-terminal concentration was not more than an equivalent weight/t of 5 which is a detection limit. A fiberboard was obtained by setting other conditions so as to be the same as the case of the embodiment 1.

The obtained fiberboard had a basis weight of 1,600 g/m², thickness of 2.3 mm, apparent density of 0.70 g/cm³, and bending strength of 40 MPa. Moreover, the carboxyl-terminal concentration of the polylactic acid resin in the board was not more than an equivalent weight/t of 5 which is a detection limit. As a result of treating the board at high temperature and high humidity of 50° C. and 95% RH for 1,200 hr, the bending strength became 16.5 MPa and the retention rate was 41%.

Embodiment 4

The polylactic acid resin was fibrosed through a publicly-known method, crimped and cut to obtain short fiber having a fineness of 6.6 deciTex and a length of 51 mm. In this case, the carboxyl-terminal concentration was an equivalent weight/t of 40. The polylactic acid resin and kenaf bast fiber cut into 65 mm were mixed at a weight ratio of 50:50 and combed to form sheets and sheets are layered to obtain a layered product having a basis weight of 1,500 g/m². The layered product was held between two dies together with a spacer having a thickness of 2.3 mm and hot-pressed by a pressing machine heated to 230° C. at a pressure of 2.4 MPa for 1 min.

The obtained fiberboard had a basis weight of 1,500 g/m², thickness of 2.3 mm, apparent density of 0.65 g/cm³, and bending strength of 59 MPa. Moreover, the carboxyl-terminal concentration of the polylactic acid resin in the board was an equivalent weight/t of 45. The bending strength was 17 MPa and the retention rate was 29% after treating the board at high temperature and high humidity of 50° C. and 95% RH.

Comparative Example 1

A layered product having a basis weight of 240 g/m² was obtained in accordance with the same conditions as the case of the embodiment 1. The layered product was held between two dies together with a spacer having a thickness of 2.3 mm and hot-pressed by a pressing machine at pressure of 2.4 MPa for 1 min. The obtained fiberboard had a basis weight of 230 g/m², thickness of 2.3 mm, apparent density of 0.1 g/cm³, and bending strength of 3.2 MPa. Moreover, the carboxyl-terminal concentration of the polylactic acid resin in the board was an equivalent weight/t of 45. As a result of treating the board at high temperature and high humidity of 50° C. and 95% RH, the bending strength became 0.63 MPa and the retention rate was 20%.

Table 1 shows results obtained from the embodiments and comparative example.

TABLE 1

| | Bending strength (MPa) | Bending strength after the treatment under the high-temperature and the high-humidity (MPa) | Retention rate of the bending strength (%) |
|---|---|---|---|
| Embodiment 1 | 33 | 7.7 | 23 |
| Embodiment 2 | 43 | 17.0 | 39 |
| Embodiment 3 | 40 | 16.5 | 41 |
| Embodiment 4 | 59 | 17.0 | 29 |
| Comparative example 1 | 3.2 | 0.63 | 20 |

According to the present invention, it is possible to provide a fiberboard capable of decreasing a load on the environment at all stages of producing, use, and final disposal of and superior in bending strength and bending-strength retention rate by combining natural fiber with polylactic acid resin.

Though preferred embodiments of the present invention are described above in detail, it should be understood that it is possible to apply various modifications, substitutions, or replacements to the embodiments as long as the embodiments are not deviated from the spirit and scope of the present invention specified in the accompanying claims.

What is claimed is:

1. A fiberboard comprising natural fiber and polylactic acid resin mixed in said natural fiber as a binder, said fiberboard (1) having a density of 0.2 g/cm$^3$ or more, (2) comprising an initial bending strength of 30 MPa or more, said bending strength being calculated in accordance with the following expression $$\text{bending strength (MPa)} = 3PL/2Wt^2$$

wherein P is the maximum bending load (N) to a test piece, L is the distance between fulcrums (mm) of the test piece, W is the width of the test piece (mm), and t is the thickness of the test piece (mm), and (3) retaining 20% or more of said initial bending strength after subjecting said fiberboard to a high temperature of 50° C. and a high humidity of 95% RH for 1,200 hours, wherein the polylactic acid resin comprises a carboxyl-terminal quantity of 10 or less equivalent weight/ton and a polycarbodiimide compound which is added to the polylactic acid resin.

2. The fiberboard according to claim 1, wherein the polylactic acid resin comprises a remaining monomer quantity under a raw pellet state of 500 ppm or less.

3. The fiberboard according to claim 1, wherein the polylactic acid resin is mixed with the natural fiber at a range between 10 and 90 wt %.

* * * * *